US008683853B2

(12) United States Patent
Wakao et al.

(10) Patent No.: US 8,683,853 B2
(45) Date of Patent: Apr. 1, 2014

(54) APPARATUS FOR DETECTING ABNORMALITY FOR FUEL PROPERTY DETECTING APPARATUS

(75) Inventors: Kazuhiro Wakao, Susono (JP); Mie Sasai, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/521,939

(22) PCT Filed: Feb. 19, 2010

(86) PCT No.: PCT/JP2010/052528
§ 371 (c)(1),
(2), (4) Date: Jul. 12, 2012

(87) PCT Pub. No.: WO2011/101980
PCT Pub. Date: Aug. 25, 2011

(65) Prior Publication Data
US 2013/0019669 A1   Jan. 24, 2013

(51) Int. Cl.
*G01M 15/04*   (2006.01)
(52) U.S. Cl.
USPC ...................................................... 73/114.42
(58) Field of Classification Search
USPC ...................................................... 73/114.42
See application file for complete search history.

(56) References Cited

U.S. PATENT DOCUMENTS

| 5,261,270 A * | 11/1993 | Gonze et al. ............... 73/61.43 |
| 8,006,671 B2 * | 8/2011 | Maeda et al. ............... 123/491 |
| 2009/0025473 A1 | 1/2009 | Imai et al. |
| 2009/0314071 A1 * | 12/2009 | Mukai ............... 73/114.38 |
| 2009/0314260 A1 | 12/2009 | Maeda et al. |
| 2011/0215813 A1 * | 9/2011 | Sasai et al. ............... 324/537 |

FOREIGN PATENT DOCUMENTS

| JP | 2-52941 U | 4/1990 |
| JP | 2-112949 U | 9/1990 |
| JP | 10-266858 A | 10/1998 |
| JP | 2007-248118 A | 9/2007 |
| JP | 2008-274825 A | 11/2008 |
| JP | 2009-185676 A | 8/2009 |
| JP | 2010-1765 A | 1/2010 |
| JP | 2010-38024 A | 2/2010 |
| JP | 2010-38052 A | 2/2010 |
| WO | 2009094735 A1 | 8/2009 |

* cited by examiner

*Primary Examiner* — Freddie Kirkland, III
(74) *Attorney, Agent, or Firm* — Sughrue Mion, PLLC

(57) ABSTRACT

An apparatus for detecting abnormality for a fuel property detecting apparatus according to the present invention includes the fuel property detecting apparatus having a sensor part provided on a fuel channel, temperature detecting means for detecting the temperature of the fuel in the vicinity of said sensor part, a heater capable of raising the temperature of the fuel in the vicinity of the sensor part, and abnormality determining means for determining whether or not there is an abnormality in the fuel property detecting apparatus based on the temperature detected by the temperature detecting means when the heater is activated. The abnormality determining means includes fuel flow abnormality determining means for determining whether or not there is an abnormality in the flow of the fuel in the vicinity of the sensor part and failure determining means for determining whether there is a failure of said fuel property detecting apparatus itself.

11 Claims, 7 Drawing Sheets

APPARATUS FOR DETECTING ABNORMALITY FOR FUEL PROPERTY DETECTING APPARATUS

CROSS REFERENCE TO RELATED APPLICATIONS

This application is a National Stage of International Application No. PCT/JP2010/052528 filed on Feb. 19, 2010, the contents of all of which are incorporated herein by reference in their entirety.

TECHNICAL FIELD

The present invention relates to an apparatus for detecting abnormality for a fuel property detecting apparatus.

BACKGROUND ART

To provide an internal combustion engine that is superior in fuel efficiency, emission level and other properties, values of engine control parameters (the fuel injection amount, the air fuel ratio, the time of ignition, the time of fuel injection, or the EGR rate, for example) have to be appropriately corrected in response to the property of the fuel. To achieve this, there are proposed various apparatuses for detecting the fuel property in order to optimally control the internal combustion engine in response to the fuel property.

To comply with the law that requires automobiles to have an on-board diagnosis (OBD) system, it may sometimes be required that it is possible to determine whether or not a fuel property detecting apparatus is normally operating and to immediately detect any abnormality occurring in the fuel property detecting apparatus.

Japanese Utility Model Laid-Open No. 2-112949 discloses a technique of outputting an alarm signal when the variation of the alcohol concentration of an alcohol blended fuel detected by an alcohol concentration sensor is equal to or higher than a predetermined value, and monitoring the variation of the air fuel ratio for a predetermined length of time if the alarm signal is output, and determining that there is an abnormality in the alcohol concentration sensor if a deviation of the air fuel ratio is detected.

CITATION LIST

Patent Literature

Patent Literature 1: Japanese Utility Model Laid-Open No. 2-112949
Patent Literature 2: Japanese Patent Laid-Open No. 2008-274825
Patent Literature 3: Japanese Patent Laid-Open No. 2007-248118
Patent Literature 4: Japanese Patent Laid-Open No. 10-266858

SUMMARY OF INVENTION

Technical Problem

However, when the same kind of fuel is continuously supplied, and the fuel property does not change, the conventional technique described above cannot detect a failure of the sensor because the detection value of the fuel property sensor shows no change. In addition, even if there is no failure of the sensor itself, the detection value of the sensor can change when the fuel flow is disturbed by a foreign matter clogging the flow channel in the vicinity of the sensor. Such a situation may be erroneously determined as a failure of the fuel property sensor.

The present invention has been devised in view of the circumstances described above, and an object of the present invention is to provide an apparatus for detecting abnormality capable of accurately detecting whether or not there is an abnormality in a fuel property detecting apparatus.

Solution to Problem

First aspect of the present invention is an apparatus for detecting abnormality for a fuel property detecting apparatus, comprising:

the fuel property detecting apparatus that has a sensor part provided on a fuel channel that feeds a fuel to an internal combustion engine, and detects a property of the fuel passing through the fuel channel;

temperature detecting means for detecting a temperature of the fuel in a vicinity of the sensor part;

a heater capable of raising the temperature of the fuel in the vicinity of the sensor part; and abnormality determining means for determining whether or not there is an abnormality in the fuel property detecting apparatus based on the temperature detected by the temperature detecting means when the heater is activated.

Second aspect of the present invention is the apparatus for detecting abnormality for a fuel property detecting apparatus according to the first aspect, wherein the abnormality determining means comprises fuel flow abnormality determining means for determining whether or not there is an abnormality in a flow of the fuel in the vicinity of the sensor part and failure determining means for determining whether or not there is a failure of the fuel property detecting apparatus itself and makes the failure determining means perform the determination when the fuel flow abnormality determining means determines that there is no abnormality in the flow of the fuel in the vicinity of the sensor part.

Third aspect of the present invention is the apparatus for detecting abnormality for a fuel property detecting apparatus according to the first or the second aspect, wherein the abnormality determining means comprises fuel flow abnormality determining means for determining whether or not there is an abnormality in a flow of the fuel in the vicinity of the sensor part, and the fuel flow abnormality determining means comprises:

flow rate obtaining means for obtaining a flow rate of the fuel passing through the fuel channel;

energy input amount obtaining means for obtaining an amount of energy input by the heater;

temperature estimating means for calculating a temperature estimated to be detected by the temperature detecting means based on the amount of energy input and the flow rate of the fuel; and means for determining whether or not there is an abnormality in the flow of the fuel in the vicinity of the sensor part by comparing an estimated temperature calculated by the temperature estimating means and the temperature actually detected by the temperature detecting means.

Fourth aspect of the present invention is the apparatus for detecting abnormality for a fuel property detecting apparatus according to the second or the third aspect, further comprising:

flow rate increasing means for performing a control to increase a flow rate of the fuel passing through the fuel channel before the fuel flow abnormality determining means performs the determination.

Fifth aspect of the present invention is the apparatus for detecting abnormality for a fuel property detecting apparatus according to the second or the third aspect, further comprising avoiding means for avoiding performing the determination by the fuel flow abnormality determining means when the flow rate of the fuel passing through the fuel channel is lower than a predetermined value.

Sixth aspect of the present invention is the apparatus for detecting abnormality for a fuel property detecting apparatus according to any one of the first to the fifth aspects, wherein the abnormality determining means comprises failure determining means for determining whether or not there is a failure of the fuel property detecting apparatus itself, the sensor part detects a value that has a temperature dependency, the fuel property detecting apparatus comprises temperature correcting means for calculating a fuel property value by performing a correction processing for a value detected by the sensor part based on the temperature of the fuel detected by the temperature detecting means, and the failure determining means obtains fuel property values subjected to the correction processing at a plurality of different points of fuel temperature when the heater is activated, and determines whether or not there is a failure of the fuel property detecting apparatus based on the difference between the fuel property values at the different points.

Seventh aspect of the present invention is the apparatus for detecting abnormality for a fuel property detecting apparatus according to the sixth aspect, wherein the sensor part is provided on a fuel distribution channel that distributes the fuel to a fuel injector in each cylinder of the internal combustion engine or in a vicinity of the fuel distribution channel, and the heater is capable of heating the fuel in the fuel distribution channel.

Eighth aspect of the present invention is the apparatus for detecting abnormality for a fuel property detecting apparatus according to the seventh aspect, wherein the failure determining means performs the determination by taking advantage of an opportunity of activating the heater during cold start of the internal combustion engine.

Ninth aspect of the present invention is the apparatus for detecting abnormality for a fuel property detecting apparatus according to the seventh or the eighth aspect, further comprising means for controlling energization of the heater based on the temperature of the fuel detected by the temperature detecting means, during cold start of the internal combustion engine.

Advantageous Effects of Invention

According to the first aspect of the present invention, whether or not there is an abnormality in the fuel property detecting apparatus can be quickly and accurately detected by raising the temperature of the fuel in the vicinity of the sensor part of the fuel property detecting apparatus by means for the heater and detecting the temperature in the vicinity of the sensor part at this point in time.

According to the second aspect of the present invention, it is possible to accurately distinguish between abnormalities in the flow of the fuel in the vicinity of the sensor part and failures of the fuel property detecting apparatus itself.

According to the third aspect of the present invention, whether or not there is an abnormality in the flow of the fuel in the vicinity of the sensor part can be determined by comparing the temperature estimated based on the amount of energy input by the heater and the flow rate of the fuel in the fuel channel and the actually detected temperature. In this way, whether or not there is an abnormality in the flow of the fuel in the vicinity of the sensor part can be accurately detected in a simple manner.

According to the fourth aspect of the present invention, the detection precision can be improved because the abnormality detection control for the flow of the fuel in the vicinity of the sensor part can be performed when the flow rate of the fuel in the fuel channel is high.

According to the fifth aspect of the present invention, the detection precision can be improved because the abnormality detection control for the flow of the fuel in the vicinity of the sensor part can be performed when the flow rate of the fuel in the fuel channel is high.

According to the sixth aspect of the present invention, whether or not there is a failure of the fuel property detecting apparatus itself can be quickly and accurately detected.

According to the seventh aspect of the present invention, the heater for heating the fuel in the fuel distribution channel can be used for abnormality detection for the fuel property detecting apparatus and the fuel property detecting apparatus does not have to have a dedicated heater. As a result, the structure of the fuel property detecting apparatus can be simplified, and the cost can be reduced.

According to the eighth aspect of the present invention, the failure determining means can perform the failure detection for the fuel property detecting apparatus by taking advantage of the opportunity of activating the heater that heats the fuel in the fuel distribution channel during cold start of the internal combustion engine. Therefore, there is no need to activate the heater for the purpose of detecting a failure of the fuel property detecting apparatus, so that energy waste can be reduced.

According to the ninth aspect of the present invention, energization of the heater that heats the fuel in the fuel distribution channel can be controlled based on the detected fuel temperature. Therefore, the temperature of the fuel supplied to the internal combustion engine during cold start can be raised to a necessary and sufficient extent, so that poor vaporization of the fuel can be prevented with reliability, and at the same time, energy waste can be reduced.

DESCRIPTION OF EMBODIMENTS

Figure 1:
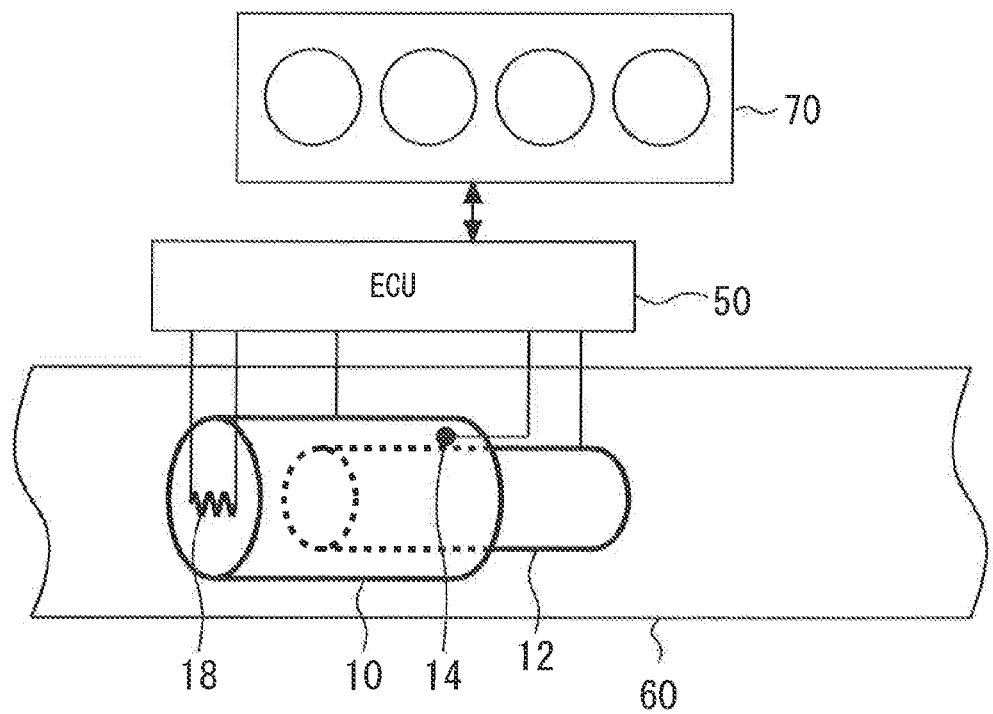
FIG. 1 is a schematic diagram showing a configuration of an apparatus according to an embodiment 1 of the present invention.

In the following, embodiments of the present invention will be described with reference to the drawings. Throughout the drawings, the same components are denoted by the same reference numerals, and redundant description thereof will be omitted.

Embodiment 1

FIG. 1 is a schematic diagram showing a configuration of an apparatus according to an embodiment 1 of the present invention. The apparatus according to this embodiment is to be mounted on an automobile that uses a fuel containing a constituent (ethanol in this embodiment) derived from biomass, and has a function of detecting the concentration of the constituent in the fuel.

As shown in FIG. 1, the apparatus according to this embodiment comprises electrodes 10 and 12, a temperature sensor 14, a heater 18, and an electronic control unit (ECU) 50. The electrodes 10 and 12 and the temperature sensor 14 are electrically connected to the ECU 50. The ECU 50 is configured to be capable of controlling energization of the heater 18. Furthermore, various actuators, such as a fuel injector, an ignition plug and a throttle valve, and various sensors, such as a crank angle sensor and an air fuel ratio sensor, provided for an internal combustion engine (referred to simply as an engine, hereinafter) 70 are electrically connected to the ECU 50.

The electrodes 10 and 12 are disposed in a fuel channel 60 that feeds the fuel from a fuel tank (not shown) to the fuel injector of the engine 70. The electrodes 10 and 12 have a cylindrical shape and are concentrically arranged with the electrode 12 with the smaller diameter inserted in the electrode 10 with the larger diameter. In the configuration shown in this drawing, the electrodes 10 and 12 are disposed so that the center lines thereof are parallel to the direction of the flow of the fuel in the fuel channel 60. This facilitates the flow of the fuel through the gap between the electrodes 10 and 12 and ensures that the fuel is prevented from dwelling in the gap between the electrodes 10 and 12.

The temperature sensor 14 is a thermistor, for example, and is disposed close to the electrodes 10 and 12. The temperature sensor 14 can detect the temperature of the fuel between the electrodes 10 and 12. Furthermore, the heater 18 is disposed close to the electrodes 10 and 12. The temperature of the fuel between the electrodes 10 and 12 can be raised by energizing the heater 18 to heat the fuel.

Figure 2:
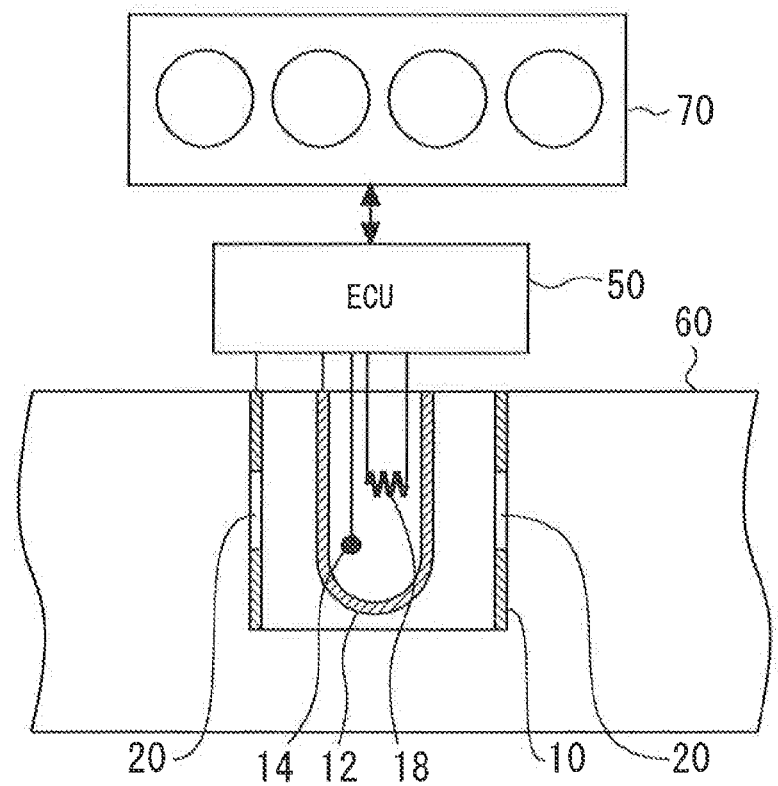
FIG. 2 is a schematic diagram showing another example of the configuration of the apparatus according to the embodiment 1 of the present invention.

FIG. 2 is a schematic diagram showing another example of the configuration of the apparatus according to the embodiment 1 of the present invention. In the apparatus shown in FIG. 2, the electrode 10 with the larger diameter and the electrode 12 with the smaller diameter, which have a cylindrical shape and are concentrically arranged, are disposed so that the center lines thereof are perpendicular to the direction of the flow of the fuel in the fuel channel 60. FIG. 2 shows cross sections of the electrodes 10 and 12. Two openings 20 disposed in alignment with the direction of the flow of the fuel are formed in the side wall of the outer electrode 10. The fuel flowing through the fuel channel 60 can enter the gap between the electrodes 10 and 12 through the opening 20 on the upstream side and exit through the opening 20 on the downstream side. In this way, the fuel can readily flow through the gap between the electrodes 10 and 12, and the fuel can be prevented from dwelling in the gap between the electrodes 10 and 12 with reliability.

In the apparatus shown in FIG. 2, the temperature sensor 14 and the heater 18 are disposed inside the electrode 12. The electrode 12 has a closed end so that no fuel enters the interior of the electrode 12. Therefore, the temperature sensor 14 and the heater 18 are not in direct contact with the fuel. However, the temperature of the fuel in the gap between the electrodes 10 and 12 approximately equals to the temperature in the electrode 12, so that the temperature detected by the temperature sensor 14 can be regarded as the temperature of the fuel between the electrodes 10 and 12. Heat generated by the heater 18 is transferred to the fuel in the gap between the electrodes 10 and 12, so that the temperature of the fuel between the electrodes 10 and 12 can be raised by the heater 18.

The apparatus shown in FIG. 2 is the same as the apparatus shown in FIG. 1 in the other respects than described above. Either of the apparatus configurations shown in FIGS. 1 and 2 can be used to implement this embodiment. The following description holds true for both the apparatus configurations shown in FIGS. 1 and 2.

The ECU 50 has a function of detecting (measuring) the capacitance between the electrodes 10 and 12. The capacitance between the electrodes 10 and 12 (referred to simply as a capacitance hereinafter) varies with the relative dielectric constant of the fuel between the electrodes 10 and 12. The ethanol containing fuel varies in relative dielectric constant with the concentration of the ethanol contained therein, and therefore, the capacitance varies with the ethanol concentration of the fuel between the electrodes 10 and 12.

Figure 3:
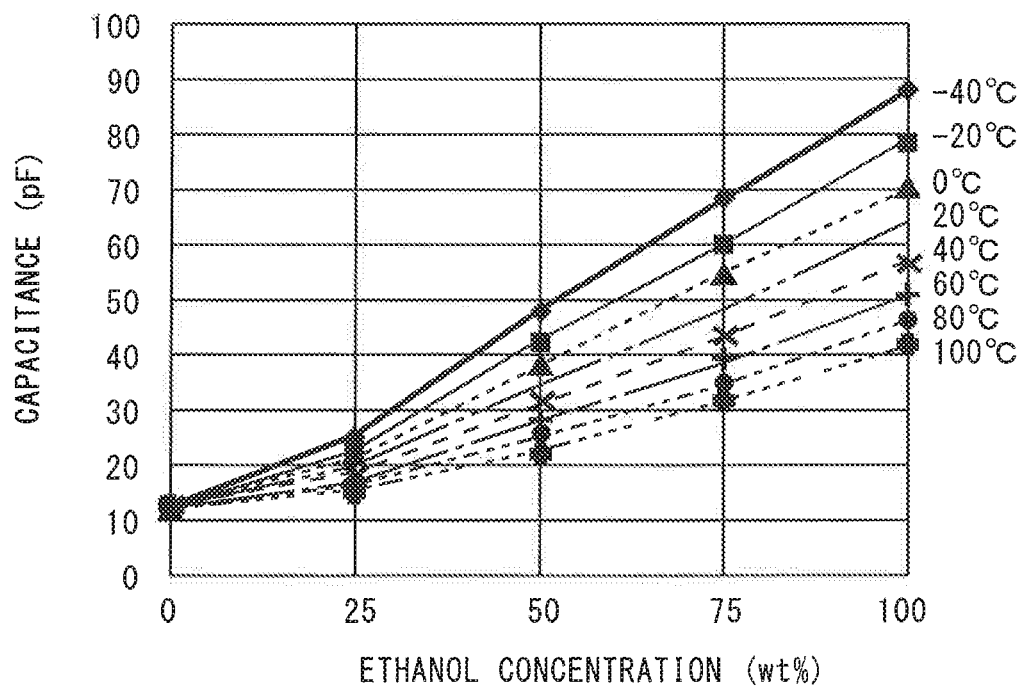
FIG. 3 is a diagram showing relationships between an ethanol concentration, a temperature and a capacitance of an ethanol containing fuel.

The relative dielectric constant of ethanol also varies with the temperature. Therefore, the capacitance also varies with the temperature. That is, the capacitance varies with the ethanol concentration and the temperature of the ethanol containing fuel. FIG. 3 is a diagram showing relationships between the ethanol concentration, the temperature and the capacitance of the ethanol containing fuel. The ECU 50 previously stores a map such as that shown in FIG. 3 (referred to as an ethanol concentration calculating map, hereinafter). Based on the detected capacitance, the fuel temperature detected by the temperature sensor 14, and the ethanol concentration calculating map shown in FIG. 3, the ECU 50 can calculate the ethanol concentration.

When the flow of the fuel between the electrodes 10 and 12 is blocked by a foreign matter between the electrodes 10 and 12 or some other cause, the fuel once entering the gap between the electrodes 10 and 12 does not exit but continues dwelling between the electrodes 10 and 12, so that the ethanol concentration of the fuel flowing in the fuel channel 60 cannot be accurately detected. It is desirable to be able to immediately detect any such situation.

According to this embodiment, an abnormality in the flow of the fuel between the electrodes is detected as described below. When the heater 18 heats the fuel between the electrodes 10 and 12, the temperature of the fuel between the electrodes 10 and 12 detected by the temperature sensor 14 (referred to as an electrode part temperature hereinafter) is determined by the balance between the amount of heat applied by the heater 18 (the amount of energy input) and the amount of heat removed by the flow of the fuel. Therefore, the electrode part temperature can be estimated based on the amount of heat applied by the heater 18 and the flow rate of the fuel in the fuel channel 60. When the flow of the fuel between the electrodes is blocked by an abnormality, the amount of heat removed decreases, so that the electrode part temperature detected by the temperature sensor 14 is higher than the estimated electrode part temperature. Therefore, whether the flow of the fuel between the electrodes is normal or abnormal can be determined by comparing the electrode part temperature detected by the temperature sensor 14 with the estimated electrode part temperature.

Figure 4:
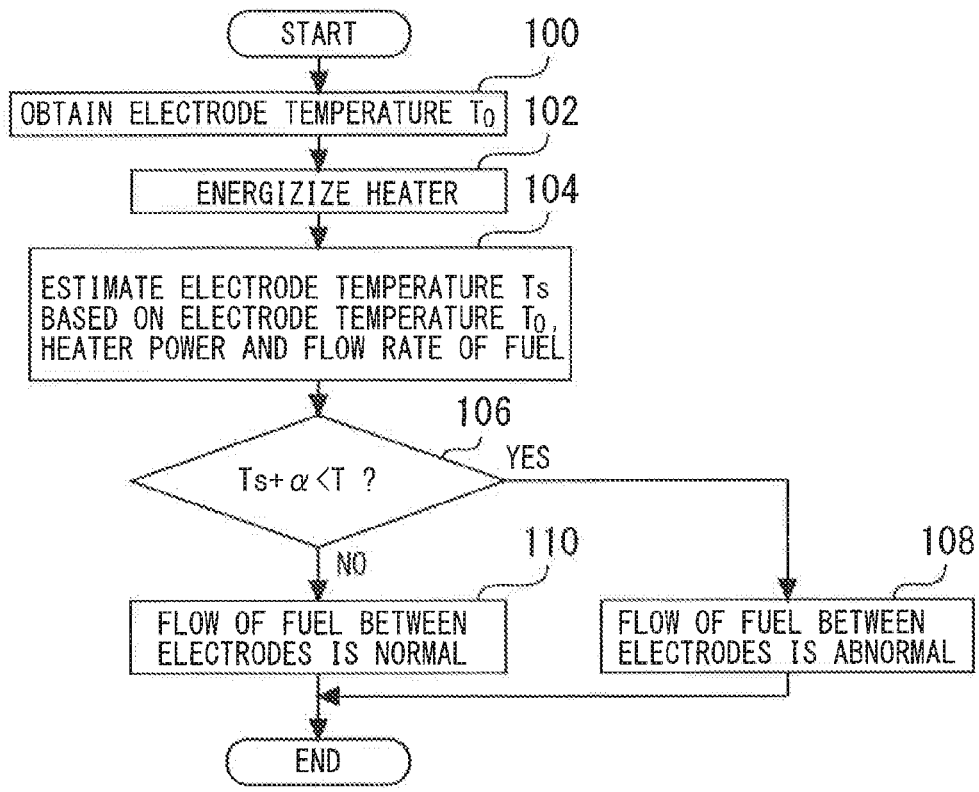
FIG. 4 is a flowchart showing a routine performed in the embodiment 1 of the present invention.

FIG. 4 is a flowchart showing a routine performed by the ECU 50 to determine whether or not there is an abnormality in the flow of the fuel between the electrodes according to this embodiment. According to the routine shown in FIG. 4, the detection value of the temperature sensor 14 is first obtained before start of energization of the heater 18 (Step 100). The detection value will be referred to as an initial electrode part temperature hereinafter and denoted by a symbol $T_0$. Then, energization of the heater 18 is started (Step 102).

Figure 5:
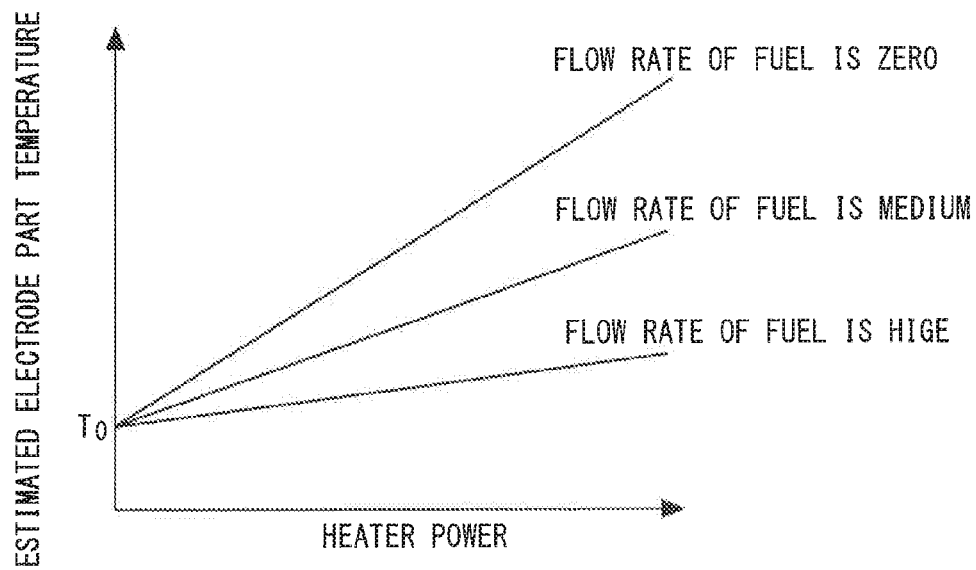
FIG. 5 is a map used for calculating an estimated electrode part temperature.

Then, a process of estimating the electrode part temperature is performed (Step 104). The estimated value will be referred to an estimated electrode part temperature and denoted by a symbol Ts. In Step 104, the estimated electrode part temperature Ts is calculated based on the initial electrode part temperature $T_0$ obtained in Step 102, the amount of electric power applied to the heater 18 (referred to as a heater power hereinafter), and the flow rate of the fuel in the fuel channel 60. FIG. 5 is a map used for calculating the estimated electrode part temperature Ts. The heater power can be regarded as being equal to the amount of heat applied by the heater 18 (the amount of energy input). The electrode part temperature rises beyond the initial electrode part temperature $T_0$ more significantly as the amount of applied heat (heater power) increases. On the other hand, as the flow rate of the fuel in the fuel channel 60 increases, the electrode part temperature lowers because the amount of removed heat increases. That is, the electrode part temperature rises as the fuel flow rate decreases. Thus, the estimated electrode part temperature Ts can be calculated from the map shown in FIG. 5. Besides, the flow rate of the fuel in the fuel channel 60 is proportional to the amount of fuel consumed by the engine 70, and therefore, the ECU 50 can calculate the fuel flow rate based on the fuel injection amount from the fuel injector.

Then, the estimated electrode part temperature Ts calculated in Step 104 and a measurement value T of the electrode part temperature measured at this point in time by the temperature sensor 14 are compared with each other (Step 106). Specifically, it is determined whether the following formula holds or not.

$$Ts+\alpha<T \qquad (1)$$

In the formula (1), α denotes a value previously set as a maximum allowable error with which the value falls within a normal range. If it is determined in Step 106 that the formula (1) holds, the measured value T of the electrode part temperature can be regarded as being significantly higher than the estimated electrode part temperature Ts. In this case, it can be decided that the deviation of the measured value T of the electrode part temperature from the estimated electrode part temperature Ts is due to an abnormality in the flow of the fuel between the electrodes. Thus, in this case, it is determined that there is an abnormality in the flow of the fuel between the electrodes (Step 108).

On the other hand, if it is determined in Step 106 that the formula (1) does not hold, the measured value T of the electrode part temperature is not significantly higher than the estimated electrode part temperature Ts, so that it can be decided that the fuel normally flows between the electrodes 10 and 12. Thus, in this case, it is determined that the flow of the fuel between the electrodes is normal (Step 110).

The abnormality detecting control for the flow of the fuel between the electrodes described above can be performed any time when the fuel is flowing in the fuel channel 60. However, the abnormality detection precision is higher when the flow rate of the fuel in the fuel channel 60 is somewhat high. This is because, if the flow rate of the fuel in the fuel channel 60 is low (that is, the engine load is low, and the fuel consumption is low), the flow of the fuel between the electrodes is intrinsically slow, so that it is difficult to determine whether or not there is an abnormality in the flow of the fuel between the electrodes.

Figure 6:
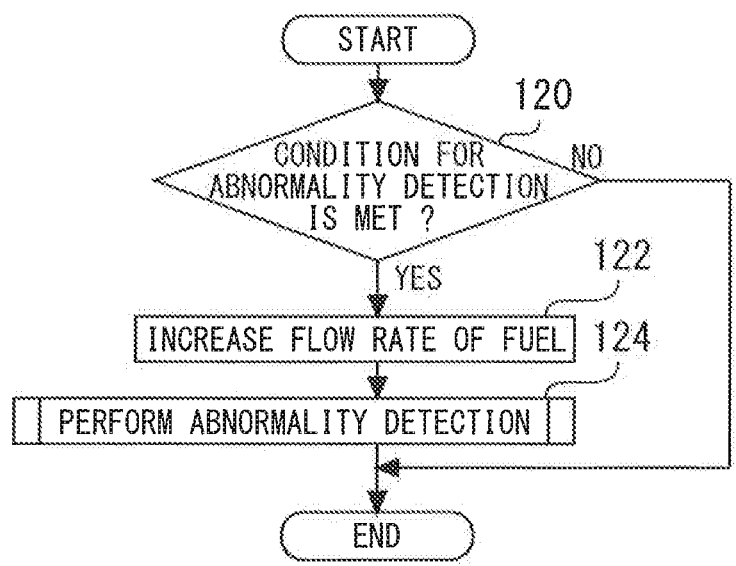
FIG. 6 is a flowchart showing a routine performed in the embodiment 1 of the present invention.

Thus, in performing the abnormality detecting control for the flow of the fuel between the electrodes, a control to increase the fuel flow rate can be performed in order to improve the detection precision. FIG. 6 is a flowchart showing a routine performed by the ECU 50 to perform such a control.

According to the routine shown in FIG. 6, it is determined whether a condition for performing the abnormality detecting control for the flow of the fuel between the electrodes is met or not (Step 120). The abnormality detecting control for the flow of the fuel between the electrodes is performed at predetermined times, such as every predetermined time and once in each trip from start to end of the engine. In Step 120, it is determined whether the predetermined time to perform the abnormality detecting control has come or not.

If it is determined in Step 120 that the abnormality detecting control for the flow of the fuel between the electrodes can be performed, the control to increase the flow rate of the fuel in the fuel channel 60 is performed (Step 122). This control can be performed as described below, for example.

(1) In a case of a hybrid vehicle that has the engine 70 and an electric motor, the engine 70 is made to run with high load to increase the amount of generated electric power, and the battery is charged with the excess of the electric power. In this way, the fuel consumption of the engine 70 can be increased, and the flow rate of the fuel in the fuel channel 60 can be increased.

(2) In a case of an apparatus provided with fuel return channels that feed the excess of the fuel not injected by the fuel injector back to the fuel tank, the fuel return channels are configured as a normal fuel return channel and a high-flow-rate fuel return channel, which can be used in a switched manner. The flow rate of the fuel in the fuel channel 60 can be increased without making the engine 70 run with high load by choosing the high-flow-rate fuel return channel.

After the control to increase the flow rate of the fuel in the fuel channel 60 is performed as described above, the abnormality detecting control for the flow of the fuel between the electrodes is performed (Step 124). That is, in step S124, the processing of the routine shown in FIG. 4 described above is performed.

The control according to the routine shown in FIG. 6 described above allows the abnormality detecting control for the flow of the fuel between the electrodes to be performed in a state where the fuel flow rate is high and thus can improve the detection precision.

Figure 7:
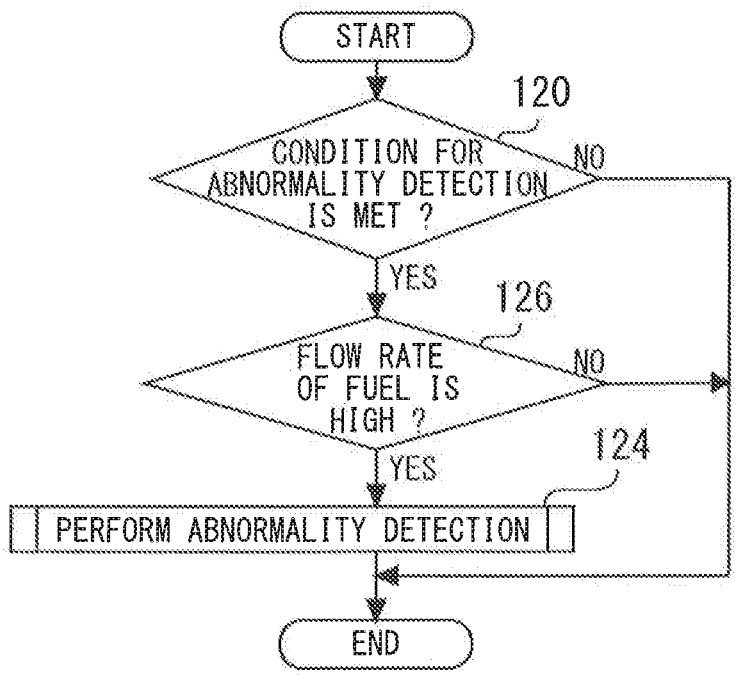
FIG. 7 is a flowchart showing a routine performed in the embodiment 1 of the present invention.

Although the control described above is performed to forcedly increase the fuel flow rate before the abnormality detecting control for the flow of the fuel between the electrodes is performed, the same effect can be achieved even if the abnormality detecting control for the flow of the fuel between the electrodes is performed after it is waited for the fuel flow rate to rise naturally. FIG. 7 is a flowchart showing a routine performed by the ECU 50 to perform such a control. In FIG.

7, the same steps as those in the routine shown in FIG. 6 are denoted by the same reference numerals, and description thereof will be omitted or simplified.

According to the routine shown in FIG. 7, if it is determined in Step 120 that the condition to perform the abnormality detecting control for the flow of the fuel between the electrodes is met, the current flow rate of the fuel in the fuel channel 60 is then obtained, and it is determined whether or not the value is equal to or higher than a predetermined value (Step 126). The predetermined value is a criterion value that indicates whether or not the abnormality in the flow of the fuel between the electrodes can be detected with sufficiently high precision. If it is determined in Step 126 that the current fuel flow rate is lower than the predetermined value, it can be predicted that the detection cannot be performed with sufficient precision, so that the abnormality detecting control for the flow of the fuel between the electrodes is not performed. On the other hand, if it is determined in Step 126 that the current fuel flow rate is equal to or higher than the predetermined value, it can be predicted that the detection can be performed with sufficient precision, so that the abnormality detecting control for the flow of the fuel between the electrodes is performed (Step 124). This control also allows the abnormality detecting control for the flow of the fuel between the electrodes to be performed in a state where the fuel flow rate is high and thus can improve the detection precision.

The embodiment 1 described above concerns an application of the present invention to an apparatus that detects a fuel property based on a capacitance. However, the present invention is not limited to this application and can be applied to an apparatus that detects a fuel property by measuring other physical quantities of the fuel, such as the index of refraction and the absorbance, for example.

In the embodiment 1 described above, the electrodes 10 and 12 correspond to a "sensor part" according to the first aspect of the present invention, the ethanol concentration corresponds to a "fuel property" according to the first aspect of the present invention, the temperature sensor 14 corresponds to "temperature detecting means" according to the first aspect of the present invention, and the capacitance (relative dielectric constant) corresponds to a "value having a temperature dependency" according to the sixth aspect of the present invention. In addition, the ECU 50 implements "fuel flow abnormality determining means" according to the second and third aspects of the present invention by performing the processing of the routine shown in FIG. 4, implements "flow rate increasing means" according to the fourth aspect of the present invention by performing the processing of the routine shown in FIG. 7, implements "avoiding means" according to the fifth aspect of the present invention by performing the processings of Steps 120 and 126, and implements "temperature correcting means" according to the sixth aspect of the present invention by calculating the ethanol concentration (fuel property value) based on the detected capacitance and fuel temperature and the map shown in FIG. 3.

Embodiment 2

Next, an embodiment 2 of the present invention will be described with reference to FIGS. 8 to 10. The following description will be mainly focused on differences from the embodiment 1 described above, and common things will be only simply described or not be described.

Figure 8:
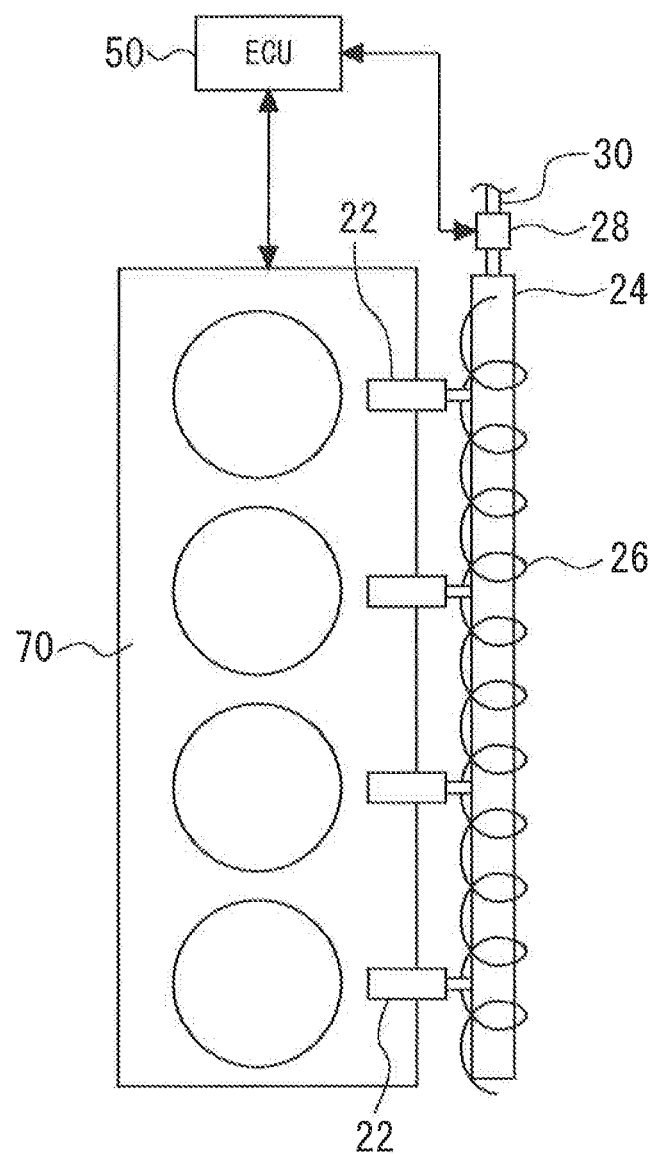
FIG. 8 is a schematic diagram showing a configuration of an apparatus according to an embodiment 2 of the present invention.

FIG. 8 is a schematic diagram showing a configuration of an apparatus according to the embodiment 2 of the present invention. As shown in FIG. 8, a fuel injector 22 provided in each cylinder of an engine 70 of the in-line four cylinder type is connected to a delivery pipe (fuel distribution channel) 24. The fuel fed from the fuel tank is distributed to the fuel injector 22 in each cylinder through the delivery pipe 24.

The delivery pipe 24 is provided with a heater 26 capable of heating the fuel in the delivery pipe 24. Energization of the heater 26 is controlled by an ECU 50. In the case of cold start of the engine 70, the fuel in the delivery pipe 24 can be heated by energizing the heater 26, so that the temperature of the fuel fed to the fuel injector 22 can be raised. Thus, even if a fuel containing a high concentration of ethanol, which is hard to vaporize at low temperatures, is used, poor vaporization of the fuel in the cold start can be prevented, and the startability and the emission characteristics can be improved.

A fuel property sensor unit 28 is provided on a fuel channel 30 in the vicinity of an inlet of the delivery pipe 24. The fuel property sensor unit 28 includes electrodes for capacitance detection and a temperature sensor that detects the temperature of the fuel between the electrodes. The arrangement of the electrodes and the temperature sensor can be the same as the arrangement shown in FIG. 1 or 2, for example. However, the fuel property sensor unit 28 does not have the heater 18.

Figure 9:
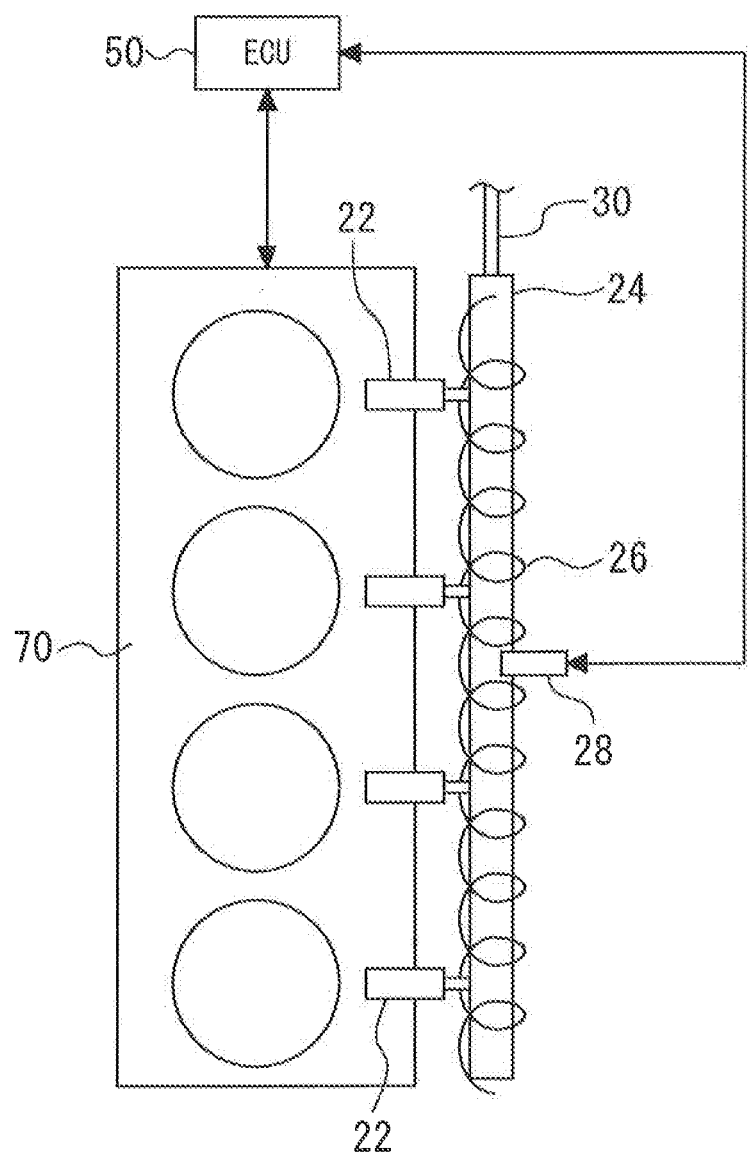
FIG. 9 is a schematic diagram showing another example of the configuration of the apparatus according to the embodiment 2 of the present invention.

FIG. 9 is a schematic diagram showing another example of the configuration of the apparatus according to the embodiment 2 of the present invention. According to this embodiment, the fuel property sensor unit 28 may be provided on the delivery pipe 24 as shown in FIG. 9. In the other respects, the configuration shown in FIG. 9 is the same as the configuration shown in FIG. 8. Either of the configurations shown in FIGS. 8 and 9 can be used to implement this embodiment. The following description holds true for both the configurations shown in FIGS. 8 and 9 unless otherwise described.

The ECU 50 can calculate the ethanol concentration of the fuel supplied to the engine 70 through the fuel channel 30 based on the capacitance and fuel temperature detected by the fuel property sensor unit 28 and the ethanol concentration calculating map shown in FIG. 3. According to this embodiment, determination of whether or not there is an abnormality in the ethanol concentration detecting apparatus is made as described below. Since the relative dielectric constant of ethanol varies with temperature as described above, the capacitance varies with the fuel temperature even if the ethanol concentration is kept constant. In view of this, a correction processing based on the fuel temperature using the ethanol concentration calculating map shown in FIG. 3 is performed to calculate the ethanol concentration. According to this embodiment, whether or not there is an abnormality in the ethanol concentration detecting apparatus is determined by calculating the ethanol concentration based on the capacitances detected at two different points of fuel temperature and determining whether or not the calculated ethanol concentrations agree with each other. If the ethanol concentration detecting apparatus is normal, the ethanol concentrations measured at the two different points of fuel temperature must agree with each other. Therefore, if the ethanol concentrations measured at the two different points of fuel temperature do not agree with each other, it can be determined that there is an abnormality in the ethanol concentration detecting apparatus. When there is an abnormality in the ethanol concentration detecting apparatus, there is low probability that the two ethanol concentration values determined from the difference capacitance values detected at the two different points of fuel temperature happen to agree with each other. Therefore, if the ethanol concentrations calculated at the two different points of fuel temperature agree with each other, it can be determined that the ethanol concentration detecting apparatus is normal.

According to this embodiment, the measurement of the ethanol concentration at two different points of fuel temperature is performed by taking advantage of the opportunity of activating the heater 26 during cold start of the engine 70. The temperature of the fuel in the fuel property sensor unit 28 is low before activation of the heater 26 and high after activation of the heater 26. Accordingly, measurements of the ethanol concentration at two different points of fuel temperature can be obtained by detecting the ethanol concentration at the times before and after activation of the heater 26.

Figure 10:
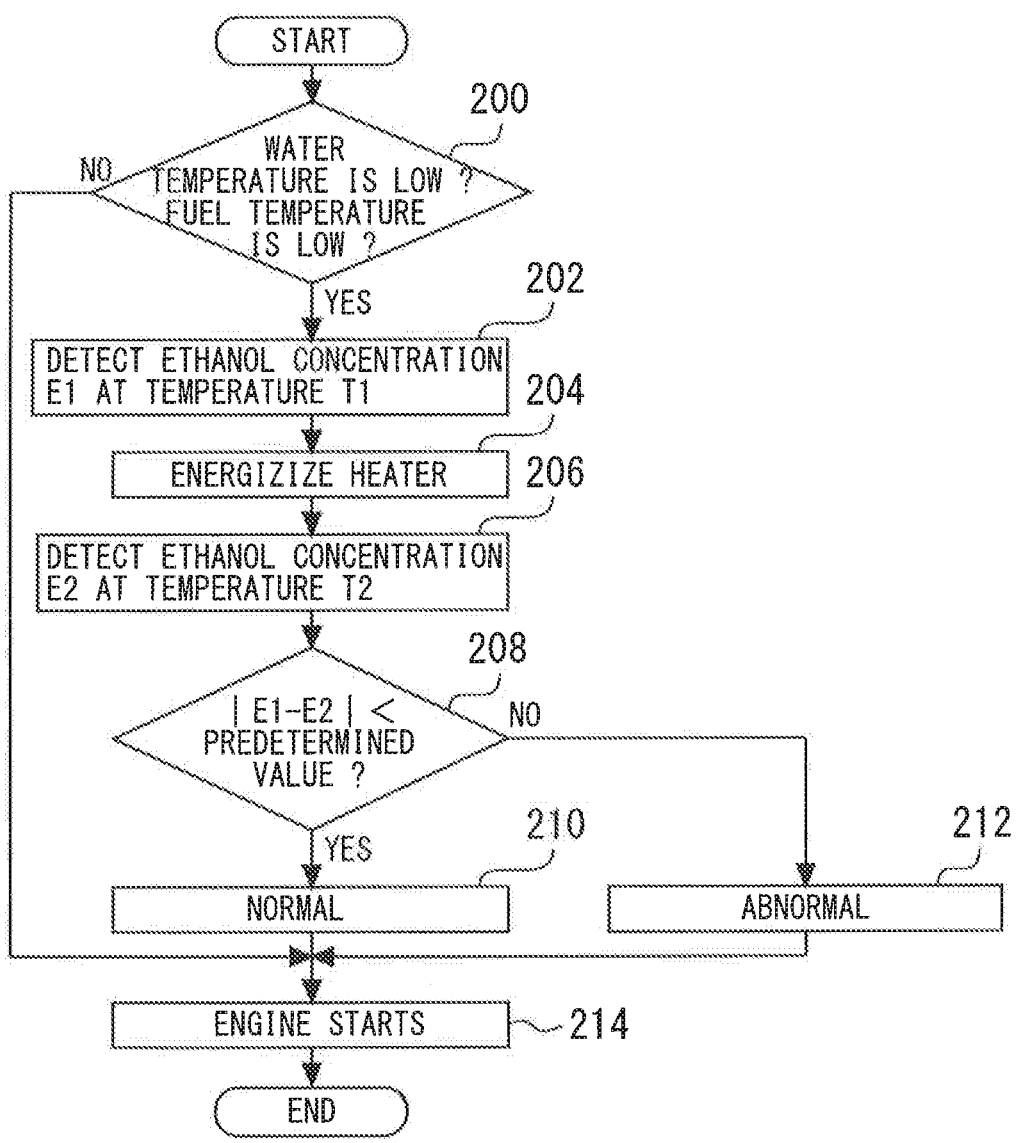
FIG. 10 is a flowchart showing a routine performed in the embodiment 2 of the present invention.

FIG. 10 is a flowchart showing a routine performed to implement the functions described above by the ECU 50 in response to a request to start the engine 70 according to this embodiment. According to the routine shown in FIG. 10, it is first determined whether or not the temperature of engine cooling water detected by a water temperature sensor (not shown) is equal to or lower than a predetermined cold criterion value and whether or not the temperature of the fuel detected by the temperature sensor in the fuel property sensor unit 28 is equal to or lower than the predetermined cold criterion value (Step 200).

If it is determined in Step 200 that at least one of the engine cooling water temperature and the fuel temperature is higher than the cold criterion value, it is determined that the engine 70 is in the warmed-up state. In this case, it can be determined that, if preheating of the fuel in the delivery pipe 24 is omitted, there is no adverse influence on the startability or the emission characteristics. Thus, in this case, the engine 70 is started without energizing the heater 26 (Step 214).

On the other hand, if both the engine cooling water temperature and the fuel temperature are equal to or lower than the cold criterion value, it is determined that the engine 70 is in the cold state, and preheating of the fuel in the delivery pipe 24 is needed. In this case, at a fuel temperature T1 at this point in time, the capacitance is detected between the electrodes in the fuel property sensor unit 28, and an ethanol concentration E1 is calculated based on the ethanol concentration calculating map (Step 202).

Then, the heater 26 is energized to heat the fuel in the delivery pipe 24 (Step 204). In the case of the configuration shown in FIG. 9, when the fuel in the delivery pipe 24 is heated, the temperature of the fuel between the electrodes in the fuel property sensor unit 28 immediately rises. In the case of the configuration shown in FIG. 8, the engine 70 has not been started and the fuel in the delivery pipe 24 and the fuel channel 30 is not flowing at this point in time, so that the heat applied by the heater 26 is readily transferred to the fuel property sensor unit 28 to raise the temperature of the fuel between the electrodes.

In Step 204, based on the temperature detected by the temperature sensor in the fuel property sensor unit 28, the amount of energization of the heater 26 can be controlled so that the temperature of the fuel in the delivery pipe 24 falls within a predetermined range. This ensures that the temperature of the fuel in the delivery pipe 24 is prevented from failing to rise to a fuel temperature required to prevent poor vaporization of the fuel at the start of the engine or from rising too high and leading to a waste of energy.

At a fuel temperature T2 detected after preheating of the fuel in the delivery pipe 24 by the heater 26, the capacitance is detected between the electrodes in the fuel property sensor unit 28, and an ethanol concentration E2 is calculated based on the ethanol concentration calculating map (Step 206). Since the temperature of the fuel in the vicinity of the fuel property sensor unit 28 has been raised by the heat from the heater 26 as described above, the fuel temperature T2 is higher than the fuel temperature T1 (T2>T1).

Then, it is determined whether or not the absolute value |E1−E2| of the difference between the ethanol concentration E1 calculated in Step 202 and the ethanol concentration E2 calculated in Step 206 is smaller than a predetermined value set as a limit of a normal error range (Step 208). If |E1−E2| is smaller than the predetermined value, it can be determined that the difference between the ethanol concentration E1 at the fuel temperature T1 and the ethanol concentration E2 at the fuel temperature T2 is not significant, and the ethanol concentrations E1 and E2 agree with each other. In this case, it is determined that the ethanol concentration detecting apparatus is normal (Step 210).

On the other hand, if it is determined in Step 208 that |E1−E2| is equal to or greater than the predetermined value, it can be determined that the difference between the ethanol concentration E1 at the fuel temperature T1 and the ethanol concentration E2 at the fuel temperature T2 is significant. In this case, it is determined that there is an abnormality in ethanol concentration detection, and the ethanol concentration detecting apparatus has failed (Step 212). In this case, the failure of the ethanol concentration detecting apparatus may be an abnormality in capacitance detection or an abnormality in the temperature correcting processing. Although the failure detection is performed based on the ethanol concentration values detected at two points of fuel temperature in this example, the failure detection may be performed by comparing ethanol concentration values detected at three or more points of fuel temperature.

After it is determined whether or not the ethanol concentration detecting apparatus is normal or has failed as described above, the engine 70 is started (Step 214).

According to this embodiment, whether or not the ethanol concentration detecting apparatus is normal or has failed can be determined with high precision.

In addition, according to this embodiment, the failure detection described above can be performed by taking advantage of the opportunity of activating the heater 26 during cold start. Consequently, the fuel does not have to be heated for the purpose of failure detection, and accordingly, energy waste is reduced. In addition, the failure detection is performed before the engine is started, when the fuel is not flowing. Consequently, the actual ethanol concentration in the vicinity of the fuel property sensor unit 28 does not differ between the time of calculation of the ethanol concentration E1 at the fuel temperature T1 and the time of calculation of the ethanol concentration E2 at the fuel temperature T2. Therefore, erroneous determination can be prevented with reliability.

According to the present invention, the time to perform the failure detection is not limited to during cold start, and the same failure detection control as described above can also be performed by activating the heater 26 in any period during operation of the engine 70.

The failure detection control described above with regard to this embodiment may be performed without using the heater 26 on the delivery pipe 24. That is, the fuel property sensor unit 28 may be provided with the heater 18 provided in the apparatus shown in FIG. 1 or 2, and the same failure detection control as described above may be performed by activating the heater 18. In this case, the fuel property sensor unit 28 does not have to be provided on the delivery pipe 24 and can be disposed at any site without any particular limitation.

Furthermore, this embodiment has been described with regard to a case where the failure detection is performed for an apparatus that detects a fuel property based on a capacitance. However, the failure detection can be equally applied to any apparatus that detects a fuel property based on any physical property value or physical quantity other than capacitance that has a temperature dependency.

In addition, according to the present invention, it is preferred that it is first detected whether or not there is an abnormality in the flow of the fuel between the electrodes (the flow of the fuel in the vicinity of the sensor part) in the method described above with regard to the embodiment 1, and then, when it is determined that the flow of the fuel between the electrodes is normal, it is determined whether or not there is a failure of the ethanol concentration detecting apparatus (the fuel property detecting apparatus) in the method according to this embodiment. In this case, when the ethanol concentration detecting apparatus itself has not failed even though there is an abnormality in the flow of the fuel between the electrodes, an erroneous determination that the ethanol concentration detecting apparatus has failed can be prevented with reliability. That is, it is possible to accurately distinguish between abnormalities in the flow of the fuel between the electrodes and failures of the ethanol concentration detecting apparatus.

In the embodiment 2 described above, the fuel property sensor unit 28 corresponds to a "sensor part" according to the first and seventh aspects of the present invention. In addition, the ECU 50 implements "failure determining means" according to the second and sixth aspects of the present invention by performing the processing of the routine shown in FIG. 10.

DESCRIPTION OF REFERENCE NUMERALS 10, 12 electrode
14 temperature sensor
18 heater
20 opening
22 fuel injector
24 delivery pipe
26 heater
28 fuel property sensor unit
30, 60 fuel channel
50 ECU
70 engine

The invention claimed is:

1. An apparatus for detecting abnormality for a fuel property detecting apparatus, comprising:
the fuel property detecting apparatus that has a sensor part provided on a fuel channel that feeds a fuel to an internal combustion engine, and detects a property of the fuel passing through the fuel channel;
temperature detecting means for detecting a temperature of the fuel in a vicinity of the sensor part;
a heater capable of raising the temperature of the fuel in the vicinity of the sensor part; and
abnormality determining means for determining whether or not there is an abnormality in the fuel property detecting apparatus based on the temperature detected by the temperature detecting means when the heater is activated,
wherein the abnormality determining means comprises failure determining means for determining whether or not there is a failure of the fuel property detecting apparatus itself,
the sensor part detects a value that has a temperature dependency,
the fuel property detecting apparatus comprises temperature correcting means for calculating a fuel property value by performing a correction processing for a value detected by the sensor part based on the temperature of the fuel detected by the temperature detecting means, and
the failure determining means obtains fuel property values subjected to the correction processing at a plurality of different points of fuel temperature when the heater is activated, and determines whether or not there is a failure of the fuel property detecting apparatus based on the difference between the fuel property values at the different points.

2. The apparatus for detecting abnormality for a fuel property detecting apparatus according to claim 1, wherein the sensor part is provided on a fuel distribution channel that distributes the fuel to a fuel injector in each cylinder of the internal combustion engine or in a vicinity of the fuel distribution channel, and
the heater is capable of heating the fuel in the fuel distribution channel.

3. The apparatus for detecting abnormality for a fuel property detecting apparatus according to claim 2, wherein the failure determining means performs the determination by taking advantage of an opportunity of activating the heater during cold start of the internal combustion engine.

4. The apparatus for detecting abnormality for a fuel property detecting apparatus according to claim 2, further comprising means for controlling energization of the heater based on the temperature of the fuel detected by the temperature detecting means, during cold start of the internal combustion engine.

5. An apparatus for detecting abnormality for a fuel property detecting apparatus, comprising:
the fuel property detecting apparatus that has a sensor part provided on a fuel channel that feeds a fuel to an internal combustion engine, and detects a property of the fuel passing through the fuel channel;
temperature detecting means for detecting a temperature of the fuel in a vicinity of the sensor part;
a heater capable of raising the temperature of the fuel in the vicinity of the sensor part; and
abnormality determining means for determining whether or not there is an abnormality in the fuel property detecting apparatus based on the temperature detected by the temperature detecting means when the heater is activated,
wherein the abnormality determining means comprises fuel flow abnormality determining means for determining whether or not there is an abnormality in a flow of the fuel in the vicinity of the sensor part and failure determining means for determining whether or not there is a failure of the fuel property detecting apparatus itself and makes the failure determining means perform the determination when the fuel flow abnormality determining means determines that there is no abnormality in the flow of the fuel in the vicinity of the sensor part.

6. The apparatus for detecting abnormality for a fuel property detecting apparatus according to claim 5, further comprising:
flow rate increasing means for performing a control to increase a flow rate of the fuel passing through the fuel channel before the fuel flow abnormality determining means performs the determination.

7. The apparatus for detecting abnormality for a fuel property detecting apparatus according to claim 5, further comprising avoiding means for avoiding performing the determination by the fuel flow abnormality determining means when the flow rate of the fuel passing through the fuel channel is lower than a predetermined value.

8. An apparatus for detecting abnormality for a fuel property detecting apparatus, comprising:

the fuel property detecting apparatus that has a sensor part provided on a fuel channel that feeds a fuel to an internal combustion engine, and detects a property of the fuel passing through the fuel channel;

temperature detecting means for detecting a temperature of the fuel in a vicinity of the sensor part;

a heater capable of raising the temperature of the fuel in the vicinity of the sensor part; and abnormality determining means for determining whether or not there is an abnormality in the fuel property detecting apparatus based on the temperature detected by the temperature detecting means when the heater is activated, wherein the abnormality determining means comprises fuel flow abnormality determining means for determining whether or not there is an abnormality in a flow of the fuel in the vicinity of the sensor part, and the fuel flow abnormality determining means comprises:

flow rate obtaining means for obtaining a flow rate of the fuel passing through the fuel channel;

energy input amount obtaining means for obtaining an amount of energy input by the heater;

temperature estimating means for calculating a temperature estimated to be detected by the temperature detecting means based on the amount of energy input and the flow rate of the fuel; and means for determining whether or not there is an abnormality in the flow of the fuel in the vicinity of the sensor part by comparing an estimated temperature calculated by the temperature estimating means and the temperature actually detected by the temperature detecting means.

9. An apparatus for detecting abnormality for a fuel property detecting apparatus, comprising:

the fuel property detecting apparatus that has a sensor part provided on a fuel channel that feeds a fuel to an internal combustion engine, and detects a property of the fuel passing through the fuel channel;

a temperature detecting device for detecting a temperature of the fuel in a vicinity of the sensor part;

a heater capable of raising the temperature of the fuel in the vicinity of the sensor part; and an abnormality determining device for determining whether or not there is an abnormality in the fuel property detecting apparatus based on the temperature detected by the temperature detecting device when the heater is activated, wherein the abnormality determining device comprises a failure determining device for determining whether or not there is a failure of the fuel property detecting apparatus itself, the sensor part detects a value that has a temperature dependency, the fuel property detecting apparatus comprises a temperature correcting device for calculating a fuel property value by performing a correction processing for a value detected by the sensor part based on the temperature of the fuel detected by the temperature detecting device, and the failure determining device obtains fuel property values subjected to the correction processing at a plurality of different points of fuel temperature when the heater is activated, and determines whether or not there is a failure of the fuel property detecting apparatus based on the difference between the fuel property values at the different points.

10. An apparatus for detecting abnormality for a fuel property detecting apparatus, comprising:

the fuel property detecting apparatus that has a sensor part provided on a fuel channel that feeds a fuel to an internal combustion engine, and detects a property of the fuel passing through the fuel channel;

a temperature detecting device for detecting a temperature of the fuel in a vicinity of the sensor part;

a heater capable of raising the temperature of the fuel in the vicinity of the sensor part; and an abnormality determining device for determining whether or not there is an abnormality in the fuel property detecting apparatus based on the temperature detected by the temperature detecting device when the heater is activated, wherein the abnormality determining device comprises a fuel flow abnormality determining device for determining whether or not there is an abnormality in a flow of the fuel in the vicinity of the sensor part and a failure determining device for determining whether or not there is a failure of the fuel property detecting apparatus itself and makes the failure determining device perform the determination when the fuel flow abnormality determining device determines that there is no abnormality in the flow of the fuel in the vicinity of the sensor part.

11. An apparatus for detecting abnormality for a fuel property detecting apparatus, comprising:

the fuel property detecting apparatus that has a sensor part provided on a fuel channel that feeds a fuel to an internal combustion engine, and detects a property of the fuel passing through the fuel channel;

a temperature detecting device for detecting a temperature of the fuel in a vicinity of the sensor part;

a heater capable of raising the temperature of the fuel in the vicinity of the sensor part; and an abnormality determining device for determining whether or not there is an abnormality in the fuel property detecting apparatus based on the temperature detected by the temperature detecting device when the heater is activated, wherein the abnormality determining device comprises a fuel flow abnormality determining device for determining whether or not there is an abnormality in a flow of the fuel in the vicinity of the sensor part, and the fuel flow abnormality determining device comprises:

a flow rate obtaining device for obtaining a flow rate of the fuel passing through the fuel channel;

an energy input amount obtaining device for obtaining an amount of energy input by the heater;

a temperature estimating device for calculating a temperature estimated to be detected by the temperature detecting device based on the amount of energy input and the flow rate of the fuel; and a device for determining whether or not there is an abnormality in the flow of the fuel in the vicinity of the sensor part by comparing an estimated temperature calculated by the temperature estimating device and the temperature actually detected by the temperature detecting device.

\* \* \* \* \*